United States Patent
Havasi et al.

(10) Patent No.: US 6,328,483 B1
(45) Date of Patent: Dec. 11, 2001

(54) ELECTRONIC OR OPTOELECTRONIC HOUSING WITH CERAMIC INSERT

(75) Inventors: Marc Havasi, Bollene; Jean-Noel Dody, Plaisir, both of (FR)

(73) Assignee: Ixas Conseil, Lyons (FR)

( * ) Notice: Subject to any disclaimer, the term of this patent is extended or adjusted under 35 U.S.C. 154(b) by 0 days.

(21) Appl. No.: 09/367,256

(22) PCT Filed: Feb. 13, 1998

(86) PCT No.: PCT/FR98/00284

§ 371 Date: Dec. 29, 1999

§ 102(e) Date: Dec. 29, 1999

(87) PCT Pub. No.: WO98/36305

PCT Pub. Date: Aug. 20, 1998

(30) Foreign Application Priority Data

Feb. 14, 1997 (FR) .................................................. 97 02177

(51) Int. Cl.[7] ...................................................... G02B 6/36
(52) U.S. Cl. .................................. 385/92; 385/88; 385/89
(58) Field of Search ................................ 385/88, 89, 92, 385/93, 94

(56) References Cited

U.S. PATENT DOCUMENTS

| 4,399,541 | 8/1983 | Kovats et al. | 372/36 |
| 4,930,857 | 6/1990 | Acarlar | 385/88 X |
| 5,109,454 | * 4/1992 | Okuno et al. | 385/92 |
| 5,790,730 | * 8/1998 | Kravitz et al. | 385/49 |
| 5,940,563 | * 8/1999 | Kobayashi et al. | 385/92 |
| 5,987,205 | * 11/1999 | Moseley et al. | 385/125 |
| 6,056,447 | * 5/2000 | Caras | 385/92 |

FOREIGN PATENT DOCUMENTS

| 0 514 213 | 11/1992 | (EP) | 372/43 X |
| 0 652 696 | 5/1995 | (EP) | 372/43 X |

* cited by examiner

*Primary Examiner*—Brian Healy
(74) *Attorney, Agent, or Firm*—Millen, White, Zelano & Branigan, P.C.

(57) ABSTRACT

A substantially parallelepiped-shaped housing for electronic or optoelectronic components is designed to receive one or several devices for routing electric transmission signals in the form of multiplayer ceramic (14, 16) and/or optical elements (11) between the outer environment and the electronic components arranged inside the housing. The housing comprises a bottom (3) and a rectangular annular frame (2) constituting walls (4, 6, 7, 8, 27, 28). The housing frame (2) is made of metal, has a continuous periphery, and has one or several slots (9, 12, 13) in a substantially intermediate position in one or several of the side walls (4, 6, 7), or in one or several notches (24, 26) arranged in overlapping position on one or several of the side walls, as well as on the bottom (23). The notches extend over the entire length of at least one edge of the housing. The housing is produced by several different manufacturing methods.

15 Claims, 2 Drawing Sheets

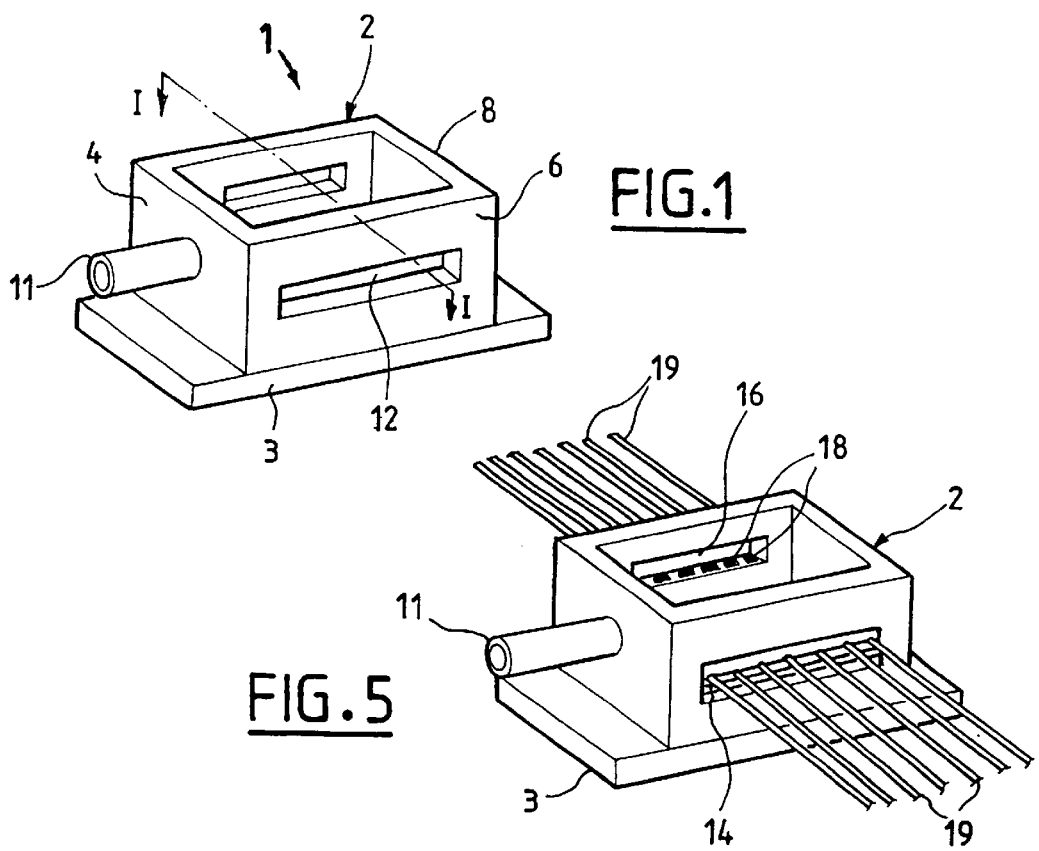
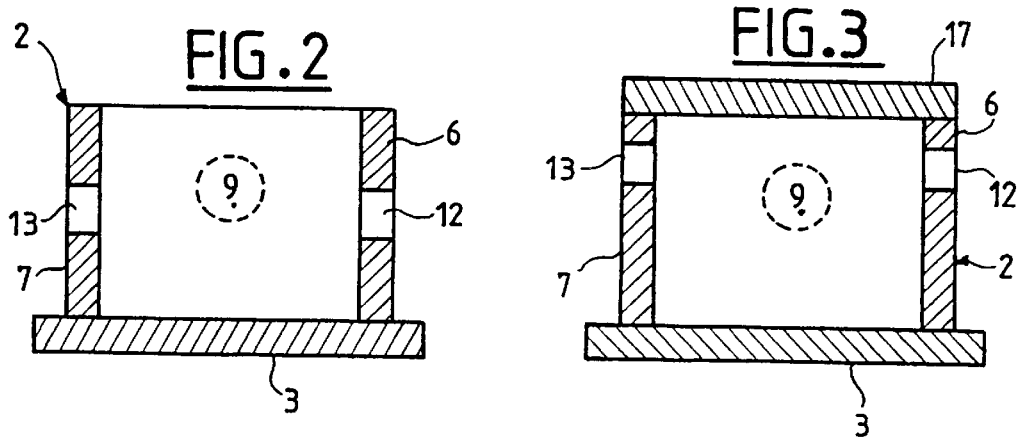
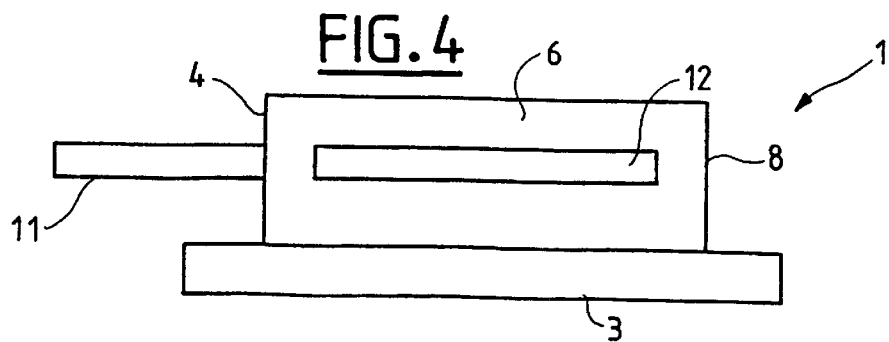

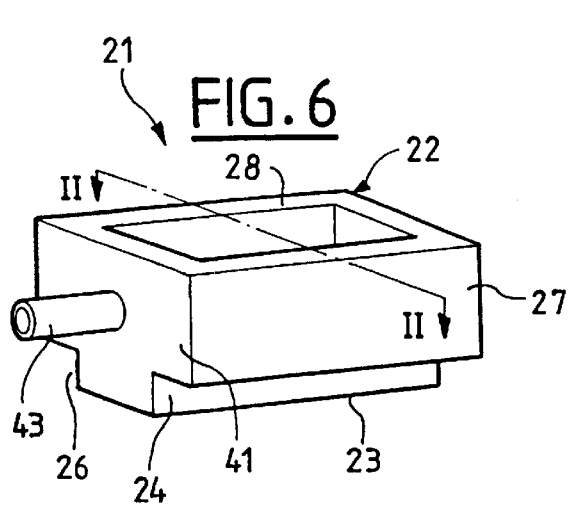
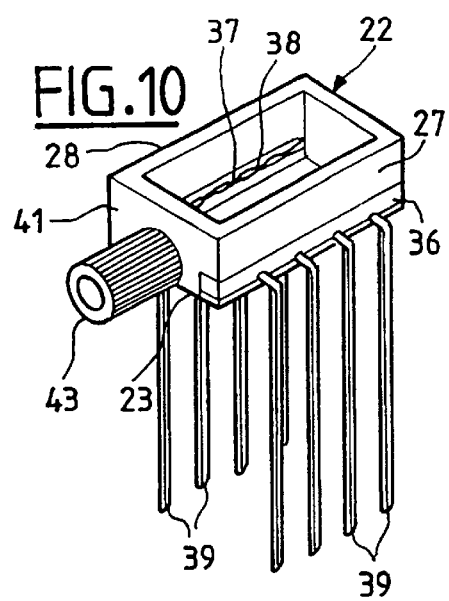
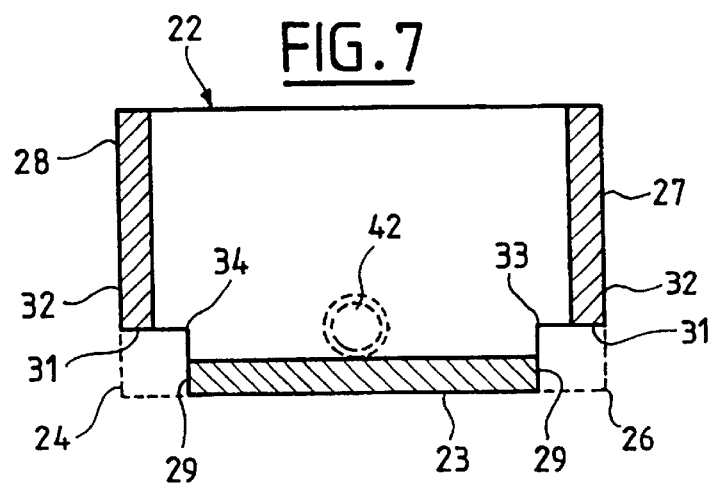
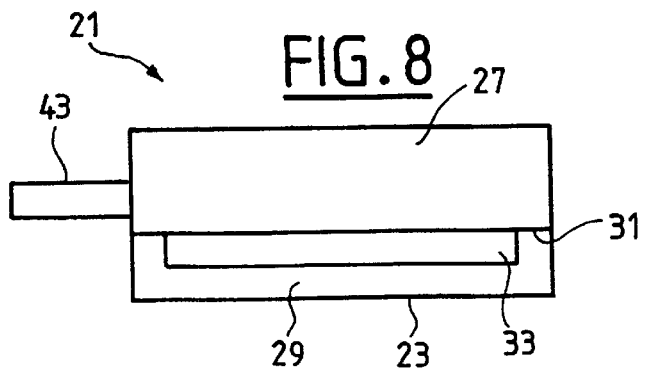
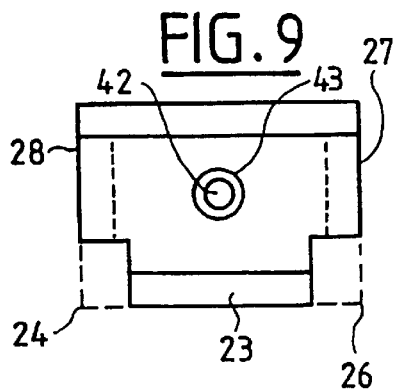

ELECTRONIC OR OPTOELECTRONIC HOUSING WITH CERAMIC INSERT

BACKGROUND OF THE INVENTION

The invention relates to a hermetic electronic or optoelectronic package designed to receive electronic components and/or circuits.

The invention also relates to at least one process for manufacturing this package.

Optoelectronic components are used as converter, between an optical signal and an electrical signal or as converter between an electrical signal and an optical signal, or else are used as repeater on cables or optical fibres in order firstly to receive, amplify and then reinject a light signal. The development of 1.3 $\mu$m laser heads for short-haul and medium-haul optical fiber links still requires the development of higher-performance packages for encapsulating these heads.

The development of other components not confined to optoelectronics also requires the production of reliable hermetic packages.

The two packages most commonly used, especially used for laser heads are, on the one hand, the DIL (Dual In-Line) package, because of the two lines of connection pins, and, on the other hand, the butterfly package, because the pins project out flat on each side of the package. An optoelectronic package has a rectangular parallelepipedal shape and comprises a bottom and a rectangular frame of variable height forming the side walls, of which:

- one is the input wall in which a tubular opening is provided, which wall includes a guide tube for inserting the optical fibers and then for passing them into the package;
- a second wall, possibly also with a tubular opening for the emission of an optical signal; and
- at least one of the other remaining walls is provided with input and/or output means for conveying electrical signals, means on which pins are fastening allowing to establish the desired connections with a printed-circuit board.

Among the most recent optoelectronic packages, there is a first generation of 14-pin butterfly packages. These are usually made of metal and are fitted with electrical-signal input/output means in the form of ceramic multilayer inserts or of connections through a glass bead via a glass-to-metal seal.

For example, a 2x7-pin package is known, which is composed, examining it from the bottom towards its lid, of:

- a metal baseplate serving as bottom;
- a first metal frame, fastened by brazing to this bottom;
- one of the side walls of which, called the input wall, includes a tubular opening and its associated tube for the passage of optical fibers; and
- the two opposed side walls of which, perpendicular to this input wall, are each cut back by a recess or indentation having a shape similar to a mortise and intended for placing the ceramic multilayer inserts; and
- a second metal frame fastened to the first frame by brazing, forming, by covering the recesses, slots into which these inserts are settled.

This type of package, easily produced on an assembly line, even automated, is relatively bulky, heavy and expensive, because of the number of components used, and has the other drawbacks mentioned below. For example, when the diameter of the hole to be produced in the frame intended for the tubular opening increases, the height of the first frame must increase in relation to the diameter of the hole and, consequently, the achievement of the package becomes more expensive to produce because it is more complex. The implementation of two frames to achieve the package requires an additional brazing bond plane which entails an additional risk of hermeticity loss of the package. In addition, the connection pins project out flat in a plane parallel to the plane defined by the bottom or by the lid of the package.

However, the trend in electronic components and in emission-reception modules for optical fibers is towards the creation of more and more compact packages. These packages have a reduced volume and may, for example, comprise a restricted number of pins so as to reduce the cost of production, but also the weight and the overall volume. There is thus a second generation of 8-pin packages called mini-DIL or SiV package, the surface area ratio of which, with respect to the first generation, is about 0.33. These second-generation optoelectronic packages are generally of the ceramic type. They are compatible, pin to pin, with those of the 14-pin first generation, i.e. they can replace them without requiring to review the general design of the internal components. They are used in particular for laser chips that are highly temperature-stable and consequently do not have built-in Peltier coolers.

For example, a 2x4-pin mini-DIL package is known which, examining it from the bottom towards its lid, is composed of:

- a bottom formed from several superposed ceramic layers; and
- a frame forming side walls, this frame consisting of a stack of fashioned ceramic layers, each layer being shaped according to the function that it has and to the result that it must provide when it is combined with the other layers.

Thus, the stack of fashioned and shaped ceramic layers leads to the creation of side walls of the package. One of the walls, called the input wall, includes an orifice which forms a tunnel obtained by this stack and allows the optical fibers to be connected to the internal part of the package. Two other opposed walls, those perpendicular to the input wall, comprise, in their massive structure, the means for conveying the electrical signals, means on which pins for the connection are fastening. Placed above the stack of ceramic layers forming the bottom and the side walls of package is a metal frame for hermetically closing the package by means of a lid.

However, this more compact type of package has drawbacks that it is important to emphasize. For example, the change in diameter required for the passage of the optical fibers needs the design (thickness, etc.) of certain ceramic layers to be reconsidered so that the functions that they provide lead to the results expected from the stack of the various recessed layers. These dimensional changes are clearly expensive, because of the extensive new modeling that they require. The formation of a package, by stacking ceramic layers, particularly in the region of the tunnel-forming orifice, imposes that the various ceramic layers intended for forming the frame by stacking have non-recessed regions in order to give sufficient mechanical strength. The regions of good mechanical strength create an unnecessary increase in the package volume. The shielding against electromagnetic phenomena may prove to be insufficient when the package is subjected to high frequencies. Finally, the hermetic closing of the package may not be reliably accomplished using any method: the most suitable method is brazing, but the necessary rise in temperature introduces additional stresses in regard to the electronic components and/or circuits present in the package.

EP-A-514,213 describes two methods for achieving a package. In the first method, a strip is cut from a metal sheet. Folding regions are marked, or slightly notched, and openings or recesses are produced, which openings or recesses will be for means for conveying the optical or electrical transmission signals. Next, the strip is folded up on itself and then welded in order to form the final frame. Lastly, the frame is fastened to the bottom. In the second of the methods, the general and complete shape of the package is cut from a metal sheet. Folding regions are marked, or slightly notched, and openings or recesses are produced, which openings or recesses will be for means for conveying the optical or electrical transmission signals. Next, the strip and the bottom are folded up on themselves and then welded in order to form the final complete package.

The major drawbacks of these methods reside in the presence of folding regions and in the presence of welded faces or intersecting edges which affect the mechanical strength of the frame and the package. The presence of a flush weld bead may be a problem when resealing, by brazing, the package with the lid. In addition, accurate folding, adjusting and welding must be difficult to achieve.

U.S. Pat. No. 4,930,857 describes an electronic and optoelectronic metal package with a ceramic multilayer component. The frame includes, in its base, a rectangular indent for passage of a ceramic multilayer component. This component, with, moreover, the entire associated electronics, is placed directly on the bottom of the package and the frame fits onto the bottom, thus enclosing the component.

A major drawback of this type of package arrangement is that, although the frame is annular and made integral, the component remains placed on the bottom and all the electronic part, especially its conducting tracks and its electrical contacts, must fit in with the height, which is always constant, fixed in advance by the indent for this component. Another drawback is that the planarity of the frame will be difficult to obtain when brazing it to the bottom. Such deformations will result in a lack of hermeticity between the frame and the ceramic component or between the ceramic component and the bottom.

SUMMARY OF THE INVENTION

This is why one object of the invention is to achieve an electronic or optoelectronic package eliminating all or some of the said drawbacks and provided, in particular, with a high shielding capability allowing improved operation in the high-frequency field.

A first problem posed is to produce a package, the frame of which is made integral, which fits in with any type of electronics by having openings that can be placed at various heights.

A package for electronic or optoelectronic components, approximately parallelepipedal, is intended to receive one or more means for conveying transmission signals between the outside and the electronic or optoelectronic components placed inside and it includes a bottom and a rectangular annular frame forming walls.

According to a first aspect of the invention, the package is characterized in that the frame is simultaneously metallic, has a perimeter without any discontinuities and is bored by one or more openings in one or more of the said side wall.

Thus, with this variable height of the openings, the height of the pins is at the height of the contacts internal to the package, this height of these contacts being imposed by the electronics of the package's user. In addition, with an emerging opening, the means for conveying signals are really inserted by all their faces within the single material and one-piece frame, thereby giving the final package an overall mechanical and thermal stability. In one of the advantageous embodiments, the openings may be made in an approximately middle position in the walls.

According to a second aspect of the invention, a package for electronic or optoelectronic components, approximately in the form of a rectangular parallelepiped, includes a bottom and a rectangular annular frame forming walls and is intended to receive one or more means for conveying transmission signals between the outside and the electronic or optoelectronic components placed inside. This package is characterized in that it includes a metal frame and one or more recesses placed in an overlapping position on one or more of the said side walls and on the bottom, the said recess or recesses making visible both a lateral end face of the thickness of the bottom and an end face of the thickness at the base of the frame.

In this embodiment, particularly suited to packages of the mini-DIL type, the space for providing an opening proves to be insufficient since the height of the frame is not very great. The choice for the insert was thus limited to one or more lower intersecting edges of the package. A second problem solved is that the insert is brazed only on two of its faces. This insert is therefore not constrained by thermal expansions and is free to expand towards its two faces that remain free. Another problem solved is that the connection pins can be easily turned downwards, i.e. perpendicular to the bottom.

In both aspects of the invention, the frame is continuous, without a weld bead or fold corners. The term "transmission signals" should be understood to mean electrical and/or optical signals.

According to a third aspect of the invention, a first method for manufacturing a package for electronic or optoelectronic components, approximately parallelepipedal with a bottom and a frame forming the walls of the package and intended to receive one or more means for conveying transmission signals between the outside and the electronic or optoelectronic components placed inside, comprises the steps consisting in cutting, transversely, a frame from a metal tube having a cross section in the form of a parallelogram; boring, by machining, one or more openings or one or more recesses in the frame obtained after the transverse cutting, the opening or openings and the recess or recesses being provided for the subsequent insertion of the means for conveying transmission signals; and fastening the said frame to the bottom.

Another method for manufacturing a package for electronic or optoelectronic components, approximately parallelepipedal with a bottom and a frame forming the walls of the package and intended to receive one or more means for conveying transmission signals between the outside and the electronic or optoelectronic components placed inside, comprises the steps consisting in stamping a metal sheet in order to give it a shape similar to a dish and thus form a blank; machining the blank, making the bottom flush, in order to obtain a frame; punching the frame so as to cut one or more openings or one or more recesses, the opening or openings and the recess or recesses being formed for the subsequent insertion of the means for conveying transmission signals; and fastening the said frame obtained to the bottom.

Yet another method for manufacturing a package for electronic or optoelectronic components, which is largely parallelepipedal with a bottom and a frame forming the walls of the package and intended to receive one or more means for conveying transmission signals between the outside and the electronic or optoelectronic components placed inside, comprises the steps consisting in machining a metal block in order to give it the final hollow parallelepipedal shape of the package and then in punching the opening or openings or the recess or recesses, the opening or openings and the recess or recesses being formed for the subsequent insertion of the means for conveying transmission signals.

BRIEF DESCRIPTION OF THE DRAWINGS

Further advantages of the packages and of the methods for achieving the packages according to the invention will appear upon reading the detailed example of implementation of the invention, with reference to the drawings given by way of illustration, in which:

FIG. 1 shows a perspective view of a package, with an attached bottom without any ceramic insert, according to the first aspect of the invention;

FIG. 2 shows a cross section of the package on the line I—I in FIG. 1;

FIG. 3 shows a cross section of a package with an attached bottom, the opening in which lies high up in the frame according to another embodiment;

FIG. 4 shows a side view of the package in FIG. 1;

FIG. 5 shows, in perspective, the package with an attached bottom, fitted with ceramic inserts provided with means for conveying electrical signals and with connection pins;

FIG. 6 shows a perspective view of a package with a bottom integrated into the integral frame, but not fitted with any ceramic insert, according to a second aspect of the invention;

FIG. 7 shows a cross section of the package on the line II—II in FIG. 6;

FIG. 8 shows a side view of the package in FIG. 6;

FIG. 9 shows a front view of a package with an attached bottom, equipped with its lid; and FIG. 10 shows a perspective view of an optoelectronic package according to the invention, with a frame having an integrated bottom, the tubular opening, the inserts provided with the means for conveying electrical signals and the pins.

DETAILED DESCRIPTION OF THE INVENTION

A package 1 comprises a integral frame 2 which has the shape that the frames of hermetic packages generally have: it is in the form of a rectangular parallelepiped. The frame 2, which is continuous, has four side walls 4, 6, 7, 8. These walls define a perimeter which may be the external lateral perimeter, the internal lateral perimeter, the upper end-face perimeter or the lower end-face perimeter, depending on the angle at which an observer looks at it, and which has no discontinuity (for joint, etc.). The package 1 is provided with a bottom 3, the thickness of which may be identical to or different from that of its side walls 4, 6, 7, 8, for example.

The material from which the frame is made is a metallic material which may preferably have a thermal expansion coefficient matched to that of the ceramic used, such as an iron-nickel-cobalt alloy known by the brand name KOVAR® (ASTM F 15 standard). The frame and the bottom are made of a KOVAR® metal alloy and are hermetically fastened together by a metal-to-metal sealing, such as a brazed joint.

The bottom 3 of the package 1 may be made of a metallic material that is different from or identical to that used for achieving the frame 2 depending on whether or not it is desired to have a package with a high thermal dissipation.

If a high thermal dissipation is desired, the material of which the bottom is composed may preferably be chosen from the group consisting of copper alone, a copper-tungsten or copper-molybdenum mixing, or else beryllium oxide or aluminum nitride, the latter two materials being at least partially metallized.

The bottom 3 of the package 1 may initially be independent of the frame and, in this case, it is attached to the base of the frame, by a metal-to-metal fastening means such as, for example, laser or electrical reflow, brazing. However, the bottom 3 may also be part and parcel of the integral frame 2 when the structure of the package 1 is made by stamping, by machining or by powder metallurgy. In addition to the frame without any discontinuities, an integral package is thus obtained which has neither weld discontinuities nor regions of weakness.

In the context of optoelectronic packages, at least one of the side walls 4 is bored by a tubular circular opening 9, allowing passage and penetration of the means for conveying optical transmission signals in the form of optical fibers inside the package 1. An element in the form of a tube 11 is inserted into the tubular opening 9 and serves for accurately guiding and directing the bundle of optical fibers towards the internal pieces with optoelectronic circuits of the package. The diameter and the height of the orifice 9 in the wall 4 do not affect the final dimensions of the package: there is therefore no expensive work to be carried out, for example in a design office or in production in order to adapt the diameter of the tubular opening to the desired dimensions of the package.

In this particular type of package dedicated to optoelectronics, two of the opposed side walls 6 and 7, which are perpendicular to the input wall 4 with circular opening, are each perforated by an opening 12, 13 made by punching, in which openings the means 18 for conveying the electrical signals, in the form of two ceramic inserts 14, 16, will subsequently be placed.

The openings 12, 13 are placed in position approximately middle of the side walls 6, 7 of the package. However, given the design flexibility of the packages, the opening or openings may be arranged at almost any height in the side wall or walls containing it or them. A given opening may preferably be approximately middle, or near the lid 17 of the package 1, or else at the boundary between the wall and the bottom, depending on the electronics and on its respective modules built into the package.

The dimensions of the openings 12, 13 are matched to those of the elements forming the ceramic multilayer inserts 14, 16 to be incorporated into the openings. These ceramic multilayer elements inserted into the opening or openings in the walls have parallelepipedal shapes and the corresponding opening or openings then has or have a rectangular shape. Finally, an opening may have a length less than the largest length of the frame 2 or be as long as the longest length of the frame 2.

The ceramic inserts 14, 16 of the means for conveying the electrical signals through the wall 2 of the package comprise all the alternating metallic conducting and ceramic insulating parts which allow the electrical signals to be conveyed through the wall of the package and which provide all the electrical contacts or the ground connections that are desired.

These inserts 14, 16 are achieved according to dimensions suitable for allowing them to be accessible from inside and from outside the package 1 in order to connect to it, on contacts 18, on the inside, the desired electronic components and/or circuits and, on the outside, the connection pins 19. These pins 19 are preferably arranged in a plane perpendicular to the side walls of the frame or in a plane parallel to the plane defined by the bottom 3 of the frame. The respective pins 19 of each of the two ceramic inserts 14, 16 project on opposite sides from each other.

The ceramic insert is generally hermetically sealed to the frame 2 of the package by the usual means, such as, for example, by brazing the end face of the thickness of the frame.

In the second aspect of the invention, in another embodiment, a package 21 comprises an integral frame 22 of rectangular parallelepipedal shape and a bottom 23. This package 21 may be made from one or more of the materials chosen from all the metallic materials mentioned above.

In another embodiment, this integral frame is provided with an integrated bottom, the thickness of which is, for example, greater than that of the side walls. The frame and the integrated bottom form an integral unit produced by machining a block of KOVAR®. The bottom may also be attached by brazing it to the base of the frame.

The metal frame 21 comprises two opposed recesses 24, 26 placed in an overlapping position on two of the opposed side walls 27, 28 and on the bottom 23. The recesses make visible both a lateral end face 29 of the thickness of the bottom 23 and an end face 31 of the thickness at the base 32 of the frame 22.

These two recesses 24, 26 also reveal two apertures 33, 34, respectively. These apertures 33, 34 are placed in a low position, at the boundary between the bottom 23 of the package 21, and by their positions they also have an overlapping place on the walls 27, 28 and the bottom 23. These recesses extend over the entire length of the two wall-bottom intersecting edges of the package 21.

These two recesses are designed to receive two ceramic multilayer insert elements 36, 37 serving as means for conveying the electrical signals. These inserts are hermetically secured both to the lateral end face 29 of the thickness of the bottom 23 and to the end face 31 of the thickness at the base 32 of the frame 22, especially by brazing. The recesses have a parallelepipedal shape corresponding to the parallelepipedal shape of the inserts. Consequently, the visible and external intersecting edges of the inserts become the intersecting edges of the package 21.

These ceramic multilayer elements 36, 37 each have conducting vias extending in a plane parallel to the side wall of the frame 27, 28. Connected to the ceramic inserts, inside the package 21, on contacts 38 therein, are the desired electronic components and/or circuits and, on the outside, the connection pins 39. Each conducting via ensures electrical connection within the ceramic layers between each internal contact 38 and each external pin 39.

By the arrangement of the inserts and the conducting vias, the pins 39 lie in a plane parallel to the plane defined by the side walls 27, 28 of the frame 22. This allows connection to the printed-circuit board again and saves an appreciable amount of space.

Finally, and in the case of optoelectronics, a tubular opening 42 is provided in one of the side walls 41 and the associated tube 43 for passage of the optical fibres is fastened.

Lastly, when all the pieces forming part of the construction of the packages according to the aspects of the invention are assembled by means of ceramic-to-metal and, if necessary, metal-to-metal or glass-to-metal fastenings, such as by brazing for example, and when the pins have been assembled by brazing to the means for conveying the electrical signals carried by the ceramic insert, the entire package may be subjected to a partial or complete nickel-plating and/or gold-plating treatment. This treatment may also be carried out on a package without its inserts or connections.

In a process for producing a package, the frame is obtained by sectioning a tube having a corresponding shape and then by directly cutting out, in the finished integral frame, the various apertures or recesses and by mounting the bottom before or after cutting the openings, depending on the type of package desired. The frame may also be prepared from a rough blank produced by known means, such as the machining of a single metal block, the stamping of a disc-shaped sheet and removal of the bottom, or by powder metallurgy.

The packages according to the invention are not limited by the details of the embodiments and of the examples chosen to illustrate them. Modifications may be made without thereby departing from the scope of the invention. For example, the number of openings or recesses in the same wall or within the package, the corresponding number of ceramic inserts or of means for conveying the signals, and the dimensions and shapes of all these openings or recesses may vary. The invention consequently encompasses all the means forming technical equivalents of the means described, as well as their combination.

What is claimed is:

1. A method for manufacturing a package for electronic or optoelectronic components approximately in the form of a rectangular parallelepiped, comprising a bottom (23) and a rectangular annular metal frame (22) forming side walls (27, 28, 41), as well as at least one opening (33, 34) intended to receive a means (36, 37) for conveying electrical transmission signals between the outside and the electronic or optoelectronic components placed inside, wherein the at least one opening (33, 34) is formed by a recess (24, 26) provided in an overlapping position on one of the side walls (27, 28) and on the bottom (23), the recess making visible both a lateral end face (29) of the thickness of the bottom (23) and an end face of the thickness (31) at the base of the frame (32); the method comprising:

cutting transversely, a frame (22) from a metal tube having a cross section in the form of a parallelogram;

boring, by machining, one or more openings (42) or one or more recesses (24, 26) in the frame obtained after the transverse cutting, the opening or openings and the recess or recesses being formed for the subsequent insertion of the means (36, 37, 43) for conveying transmission signals; and fastening the said frame (22) to the bottom (23).

2. A method for manufacturing a package for electronic or optoelectronic components approximately in the form of a rectangular parallelepiped, comprising a bottom (23) and a rectangular annular metal frame (22) forming side walls (27, 28, 41), as well as at least one opening (33, 34) intended to receive a means (36, 37) for conveying electrical transmission signals between the outside and the electronic or optoelectronic components placed inside, wherein the at least one opening (33, 34) is formed by a recess (24, 26) provided in an overlapping position on one of the side walls (27, 28) and on the bottom (23), the recess making visible both a lateral end face (29) of the thickness of the bottom (23) and an end face of the thickness (31) at the base of the frame (32); the method comprising:

stamping a metal sheet in order to give it a shape similar to a dish and thus form a blank;

machining the blank, making the bottom flush, in order to obtain a frame;

punching the frame so as to cut one or more openings or one or more recesses, the opening or openings and the recess or recesses being formed for the subsequent insertion of the means for conveying transmission signals; and fastening the frame obtained to the bottom.

3. A method for manufacturing a package for electronic or optoelectronic components, approximately in the form of a rectangular parallelepiped, comprising a bottom (23) and a rectangular annular metal frame (22) forming side walls (27, 28, 41), as well as at least one opening (33, 34) intended to receive a means (36, 37) for conveying electrical transmission signals between the outside and the electronic or optoelectronic components placed inside, wherein the at least one opening (33, 34) is formed by a recess (24, 26) provided in an overlapping position on one of the side walls (27, 28) and on the bottom (23), the recess making visible both a lateral end face (29) of the thickness of the bottom (23) and an end face of the thickness (31) at the base of the frame (32); the method comprising:

machining a metal block in order to give it the final hollow parallelepipedal shape of the package and then in punching the opening or openings or the recess or recesses, the opening or openings and the recess or recesses being formed for the subsequent insertion of the means for conveying transmission signals.

4. A package (21) for electronic or optoelectronic components, approximately in the form of a rectangular parallelepiped, comprising a bottom (23) and a rectangular annular metal frame (22) forming side walls (27, 28, 41), as well as at least one opening (33, 34) intended to receive a means (36, 37) for conveying electrical transmission signals between the outside and the electronic or optoelectronic components placed inside, characterized in that the said at least one opening (33, 34) is formed by a recess (24, 26) provided in an overlapping position on one of the said side walls (27, 28) and on the bottom (23), the said recess making visible both a lateral end face (29) of the thickness of the bottom (23) and an end face of the thickness (31) at the base of the frame (32).

5. The package according to claim 4, characterized in that the bottom (23) is integrated into the frame (22), forming a one-piece package (21) without any discontinuities.

6. The package according to claim 4, characterized in that the bottom (23) is attached to the base of the frame (22).

7. A package (21) for electronic or optoelectronic components, approximately in the form of a rectangular parallelepiped, comprising a bottom (23) and a rectangular annular metal frame (22) forming side walls (27, 28, 41), as well as at least one opening (33, 34) intended to receive a means (36, 37) for conveying electrical transmission signals between the outside and the electronic or optoelectronic components placed inside, wherein the at least one opening (33, 34) is formed by a recess (24, 26) extending over the entire length of an intersecting edge of the package provided in an overlapping position on one of the side walls (27, 28) and on the bottom (23), the recess making visible both a lateral end face (29) of the thickness of the bottom (23) and an end face of the thickness (31) at the base of the frame (32).

8. A package (21) for electronic or optoelectronic components, approximately in the form of a rectangular parallelepiped, comprising a bottom (23) and a rectangular annular metal frame (22) forming side walls (27, 28, 41), as well as at least one opening (33, 34) intended to receive a means (36, 37) for conveying electrical transmission signals between the outside and the electronic or optoelectronic components placed inside, wherein the at least one opening (33, 34) is formed by a recess (24, 26) provided in an overlapping position on one of the side walls (27, 28) and on the bottom (23), the recess making visible both a lateral end face (29) of the thickness of the bottom (23) and an end face of the thickness (31) at the base of the frame (32), at least one means for conveying electrical transmission signals between the outside and the electronic or optoelectronic components placed inside, said conveying means being in the form of at least one ceramic multiplayer element (36, 37) inserted into the recess (24, 26) and fastened both to the lateral end face (29) of the thickness of the bottom (23) and to the end face of the thickness at the base of the frame (31).

9. The package according to claim 8, wherein the at least one ceramic multiplayer element (36, 37) has at least one conducting via in a plane parallel to that side wall (27, 28) of the frame to which it is fastened.

10. The package according to claim 8, wherein the connection pins (39) are fastened to the at least one means (36, 37) for conveying electrical transmission signals in the outer part of the package, the pins (39) extending over most of their length in a plane parallel to the plane defined by the side walls (27, 28) of the frame.

11. A package (21) for electronic or optoelectronic components, approximately in the form of a rectangular parallelepiped, comprising a bottom (23) and a rectangular annular metal frame (22) forming side walls (27, 28, 41), as well as at least one opening (33, 34) intended to receive two ceramic multiplayer elements fastened in the two side walls (27, 28) (36, 37) for conveying electrical transmission signals between the outside and the electronic or optoelectronic components placed inside, wherein the at least one opening (33, 34) is formed by a recess (24, 26) provided in an overlapping position on one of the side walls (27, 28) and on the bottom (23), the recess making visible both a lateral end face (29) of the thickness of the bottom (23) and an end face of the thickness (31) at the base of the frame (32).

12. A package (21) for electronic or optoelectronic components, approximately in the form of a rectangular parallelepiped, comprising a bottom (23) and a rectangular annular metal frame (22) forming side walls (27, 28, 41), as well as at least one opening (33, 34) intended to receive a means (36, 37) for conveying electrical transmission signals between the outside and the electronic or optoelectronic components placed inside, wherein the at least one opening (33, 34) is formed by a recess (24, 26) provided in an overlapping position on one of the said side walls (27, 28) and on the bottom (23), the said recess making visible both a lateral end face (29) of the thickness of the bottom (23) and an end face of the thickness (31) at the base of the frame (32); and wherein at least one of the side walls (41) of the frame (22) is furthermore bored by a tubular aperture (42) for a fiber-optic means for conveying optical transmission signals between the outside and the optoelectronic components placed inside.

13. A package (21) for electronic or optoelectronic components, approximately in the form of a rectangular parallelepiped, comprising a bottom (23) and a rectangular annular metal frame (22) made of an iron-nickel-cobalt alloy forming side walls (27, 28, 41), as well as at least one opening (33, 34) intended to receive a means (36, 37) for conveying electrical transmission signals between the outside and the electronic or optoelectronic components placed inside, wherein the at least one opening (33, 34) is formed by a recess (24, 26) provided in an overlapping position on one of the side walls (27, 28) and on the bottom (23), the recess making visible both a lateral end face (29) of the thickness of the bottom (23) and an end face of the thickness (31) at the base of the frame (32).

14. The package according to claim 13, characterized in that the bottom (23) is made of the same material as the frame (22).

15. A package (21) for electronic or optoelectronic components, approximately in the form of a rectangular parallelepiped, comprising a bottom (23) which is made of a metal selected form the group consisting of copper, copper-tingsten alloy, copper molybdenum alloy, beryllium oxide or aluminum nitride and a rectangular annular metal frame (22) forming side walls (27, 28, 41), as well as at least one opening (33, 34) intended to receive a means (36, 37) for conveying electrical transmission signals between the outside and the electronic or optoelectronic components placed inside, wherein the at least one opening (33, 34) is formed by a recess (24, 26) provided in an overlapping position on one of the side walls (27, 28) and on the bottom (23), the recess making visible both a lateral end face (29) of the thickness of the bottom (23) and an end face of the thickness (31) at the base of the frame (32).

* * * * *